US012687123B2

(12) United States Patent
Okubo

(10) Patent No.: US 12,687,123 B2
(45) Date of Patent: Jul. 21, 2026

(54) PURIFICATION SYSTEM

(71) Applicant: ISUZU MOTORS LIMITED, Yokohama (JP)

(72) Inventor: Yasuhiro Okubo, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 19/042,846

(22) Filed: Jan. 31, 2025

(65) Prior Publication Data

US 2025/0270947 A1 Aug. 28, 2025

(30) Foreign Application Priority Data

Feb. 26, 2024 (JP) ................................ 2024-026718

(51) Int. Cl.

*F01N 3/08* (2006.01)
*F01N 13/00* (2010.01)
*F02D 41/02* (2006.01)

(52) U.S. Cl.

CPC ......... *F01N 3/0814* (2013.01); *F01N 3/0807* (2013.01); *F01N 3/0842* (2013.01); *F01N 13/002* (2013.01); *F02D 41/0235* (2013.01); *F01N 3/0885* (2013.01); *F01N 2250/12* (2013.01); *F01N 2430/06* (2013.01); *F01N 2550/03* (2013.01); *F01N 2570/14* (2013.01); *F01N 2900/1614* (2013.01); *F02D 41/022* (2013.01); *F02D 41/0275* (2013.01); *F02D 2200/0806* (2013.01)

(58) Field of Classification Search

CPC .... F01N 3/0807; F01N 3/0814; F01N 3/0842; F01N 3/0871; F01N 3/0885; F01N 13/002; F01N 2240/18; F01N 2250/12; F01N 2430/06; F01N 2550/03; F01N 2560/026; F01N 2570/14; F01N 2900/1614; F01N 2900/1621; F02D 41/0215; F02D 41/022; F02D 41/0235; F02D 41/0275; F02D 41/028; F02D 2200/0806; F02D 2200/0808

See application file for complete search history.

(56) References Cited

U.S. PATENT DOCUMENTS 10,166,988 B1 * 1/2019 Wang .................... B60W 10/08
2003/0232696 A1 * 12/2003 Shibagaki ............ B60W 10/06 477/76

(Continued)

FOREIGN PATENT DOCUMENTS

JP 2006-200362 A 8/2006

*Primary Examiner* — Binh Q Tran

(74) *Attorney, Agent, or Firm* — PROCOPIO, CORY, HARGREAVES & SAVITCH LLP

(57) ABSTRACT

A purification system includes a clutch that switches between transmitting and interrupting power of an engine to a driven device, which is driven by power of the engine and a motor, a catalyst that i) adsorbs nitrogen oxides if an air-fuel ratio is a threshold value or more, and ii) facilitates a reaction between unburned fuel and the adsorbed nitrogen oxides if the air-fuel ratio is less than the threshold value, a clutch controller that brings the clutch into the disengaged state thereby enabling the driven device to be driven solely by the power of the motor, and an operation controller that brings the air-fuel ratio of the engine to be less than the threshold value if the driven device is driven solely by the power of the motor.

10 Claims, 3 Drawing Sheets

(56) References Cited

U.S. PATENT DOCUMENTS

| | | | | |
|---|---|---|---|---|
| 2007/0251220 | A1* | 11/2007 | Dawson | F01N 3/0238 60/280 |
| 2015/0330276 | A1* | 11/2015 | Nozaki | F02D 41/0055 60/299 |
| 2016/0061317 | A1* | 3/2016 | Nagai | B60W 10/06 477/115 |
| 2019/0284978 | A1* | 9/2019 | De Smet | F02D 41/0275 |
| 2022/0275747 | A1* | 9/2022 | Luo | F01N 11/00 |
| 2022/0388514 | A1* | 12/2022 | Bare | F01N 3/027 |

* cited by examiner

PURIFICATION SYSTEM

CROSS-REFERENCE TO RELATED APPLICATIONS

The present application claims priority to Japanese Patent Applications No. 2024-26718, filed on Feb. 26, 2024, contents of which are incorporated herein by reference in their entirety.

BACKGROUND OF THE INVENTION

The present disclosure relates to a purification system for purifying exhaust gas of an engine. A technique for purifying exhaust gas of an engine is known. Japanese Unexamined Patent Application Publication No. 2006-200362 discloses an occlusion reduction catalyst that occludes nitrogen oxides in exhaust gas when an air-fuel ratio is in a lean state where a ratio of air is greater than in a stoichiometric air-fuel ratio, and facilitates a reaction between the occluded nitrogen oxides and fuel to purify the exhaust gas.

The amount of nitrogen oxides that an occlusion-reduction catalyst can adsorb is limited. Therefore, when an amount of nitrogen oxides adsorbed to a catalyst reaches or exceeds a predetermined value, it is necessary to remove the nitrogen oxide adsorbed to the catalyst by supplying fuel to the catalyst to reduce the nitrogen oxide. When an air-fuel mixture is brought into a rich state with a fuel ratio greater than in a stoichiometric air-fuel ratio in order to reduce the nitrogen oxides adsorbed to the catalyst using the fuel, the engine load may fluctuate. If the fluctuation in the engine load causes the air-fuel mixture to transition from the rich state to a lean state, the nitrogen oxides adsorbed to the catalyst may not be sufficiently reduced.

BRIEF SUMMARY OF THE INVENTION

The present disclosure focuses on this point, and an object thereof is to appropriately purify nitrogen oxides adsorbed to a catalyst.

An aspect of the present disclosure provides a purification system including a clutch that switches between transmitting and interrupting power of an engine to a driven device, which is driven by the power of the engine and power of a motor, a catalyst that i) adsorbs nitrogen oxides in exhaust gas of the engine if an air-fuel ratio is a predetermined air-fuel ratio or more, and ii) facilitates a reaction between unburned fuel contained in gas discharged from the engine and the adsorbed nitrogen oxides if the air-fuel ratio is less than the predetermined air-fuel ratio, an acquisition part that acquires an adsorption amount of the nitrogen oxides adsorbed to the catalyst, a clutch controller that controls the clutch to interrupts the power of the engine to the driven device if the driven device is driven by the power of the engine and the adsorption amount reaches or exceeds a predetermined value, and an operation controller that brings the air-fuel ratio of the engine in operation to be less than the predetermined air-fuel ratio if the adsorption amount reaches or exceeds the predetermined value and the driven device is driven solely by the power of the motor.

DETAILED DESCRIPTION OF THE INVENTION

Hereinafter, the present disclosure will be described through exemplary embodiments of the present disclosure, but the following exemplary embodiments do not limit the disclosure according to the claims, and not all of the combinations of features described in the exemplary embodiments are necessarily essential to the solution means of the disclosure.

[Configuration of Cleaning System S]

Figure 1:
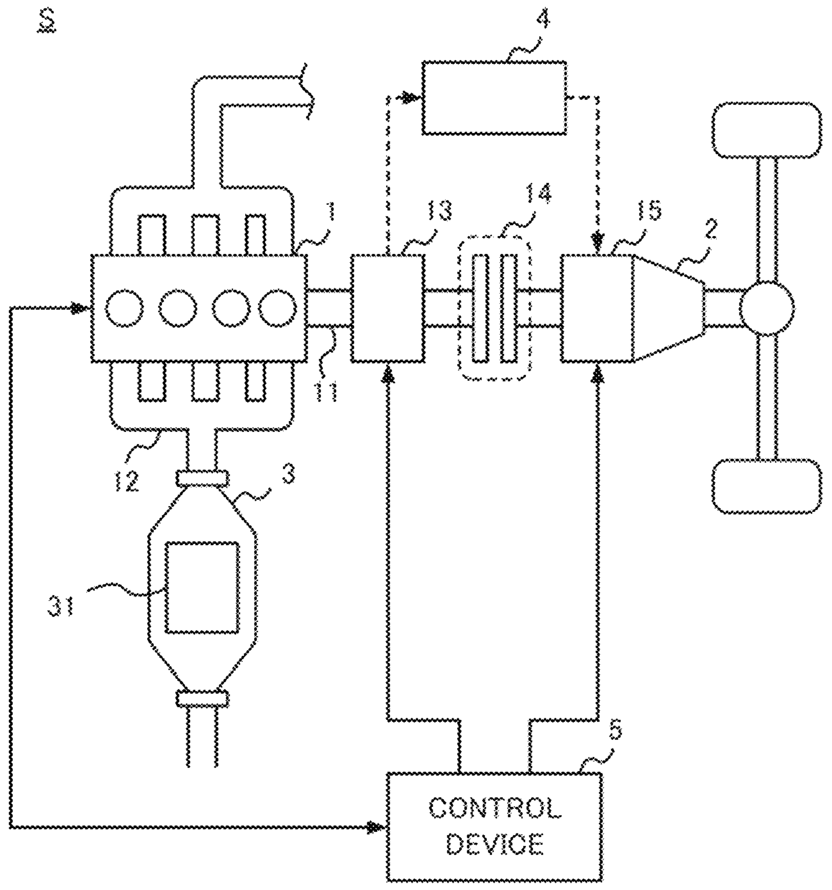
FIG. 1 illustrates a configuration of a purification system.

FIG. 1 illustrates a configuration of a purification system S. The purification system S is a system that purifies exhaust gas of an engine 1. The purification system S is mounted on a vehicle or a ship, for example. The purification system S according to the present embodiment will be described as being mounted on a vehicle. The purification system S includes a control device 5, the engine 1, a driven device 2, a purification device 3, a control device 5, a generator 13, a clutch 14, and a motor 15.

The engine 1 is an internal combustion engine that generates power by combusting and expanding a mixture of fuel and intake air. The engine 1 is a diesel engine, for example, but may be a gasoline engine. In the following description, i) a ratio of air to fuel in an air-fuel mixture is referred to as an air-fuel ratio, and ii) an air-fuel ratio at which the fuel in the air-fuel mixture and oxygen in the air react without excess or deficiency is referred to as a stoichiometric air-fuel ratio. Further, i) a state where the air-fuel ratio is equal to or greater than the stoichiometric air-fuel ratio is referred to as a lean state, and ii) a state where the air-fuel ratio is lower than the stoichiometric air-fuel ratio is referred to as a rich state. An output shaft 11 of the engine 1 is provided with the generator 13 and the clutch 14.

The generator 13 is provided between the clutch 14 and the engine 1 on the output shaft 11. The generator 13 generates electricity using the power of the engine 1. The generator 13 generates electricity by being rotated by the power of the engine 1. The generator 13 outputs alternating current generated through generation of electricity to the inverter 4.

The inverter 4 is a conversion circuit that converts voltage of alternating current. The inverter 4 converts a voltage value of the alternating current outputted by the generator 13 into a voltage value capable of driving the motor 15. When the inverter 4 receives the alternating current outputted by the generator 13, the inverter 4 converts the alternating current into voltage capable of driving the motor 15 and supplies the voltage to the motor 15.

The clutch 14 is provided at the opposite side of the engine 1 relative to the generator 13 on the output shaft 11. The clutch 14, when in an engaged state, transmits the power of the engine 1 to the driven device 2. The clutch 14, when in a disengaged state in which the power of the engine 1 to the driven device 2 is interrupted, does not transmit the power of the engine 1 to the driven device 2.

The motor 15, located at the opposite side of the generator 13 relative to the clutch 14, is connected to the clutch 14. Specifically, the motor 15 is connected to a clutch shaft of the clutch 14. The motor 15 operates by being supplied with electricity from the generator 13. The motor 15 is operated by the electricity of the generator 13 to drive the driven device 2.

The driven device 2 is a transmission, for example, but is not limited thereto. The driven device 2 may include, in addition to the transmission, a propeller shaft, a differential device, a drive shaft, and a tire-wheel assembly connected to the transmission.

The driven device 2 is driven by at least any of the power of the engine 1 or the power of the motor 15. Specifically, if the clutch 14 is in the engaged state, the driven device 2 is driven by the power of the engine 1. If the clutch 14 is in the disengaged state, the driven device 2 is driven by the power of the motor 15. In the following description, a load required to drive the driven device 2 is referred to as a driving load.

The purification device 3 is provided in an exhaust pipe 12 that discharges exhaust gas of the engine 1 to the outside. The purification device 3 purifies the exhaust gas of the engine 1. A catalyst 31 for purifying exhaust gas is provided inside the purification device 3.

The catalyst 31 is an occlusion reduction catalyst capable of adsorbing and reducing nitrogen oxides. Nitrogen oxides in exhaust gas are adsorbed to the catalyst 31 when the air-fuel ratio of the air-fuel mixture is in the rich state. However, the amount of nitrogen oxides that the catalyst 31 can adsorb is limited. When the catalyst 31 adsorbs nitrogen oxide up to its maximum capacity for adsorbing nitrogen oxides, no further nitrogen oxides will be adsorbed to the catalyst 31. Therefore, it is necessary to purify the nitrogen oxides adsorbed to the catalyst 31 to reduce the adsorption amount of nitrogen oxides adsorbed to the catalyst 31 before the amount of nitrogen oxides adsorbed to the catalyst 31 reaches the catalyst 31's maximum capacity for adsorbing nitrogen oxides.

The control device 5 reduces an adsorption amount of nitrogen oxides adsorbed to the catalyst 31 by supplying fuel to the catalyst 31 before the catalyst 31 becomes unable to adsorb further nitrogen oxides. Specifically, the control device 5 brings the air-fuel ratio of the air-fuel mixture of the operating engine 1 into the rich state before the adsorption amount of nitrogen oxides adsorbed to the catalyst 31 reaches the catalyst 31's maximum capacity for adsorbing nitrogen oxides, thereby discharging gas containing unburned fuel, which is fuel that has not been combusted in the cylinder of the engine 1, from the engine 1. Thus, the unburned fuel is supplied to the catalyst 31.

The catalyst 31 purifies nitrogen oxides when the gas containing unburned fuel is supplied from the engine 1. Specifically, the catalyst 31 converts the nitrogen oxides into nitrogen by facilitating the reaction between the nitrogen oxides adsorbed to the catalyst 31 and the unburned fuel. More specifically, the catalyst 31 converts the nitrogen oxides into nitrogen, water, and carbon dioxide by facilitating the reaction between the unburned fuel and the nitrogen oxides when the catalyst 31 is at or above its activation temperature. As described above, the catalyst 31 converts the nitrogen oxides adsorbed to the catalyst 31 into nitrogen, thereby reducing the amount of nitrogen oxide adsorbed to the catalyst 31.

The driving load of the driven device 2 may fluctuate while the air-fuel mixture of the operating engine 1 is in the rich state. If the air-fuel mixture of the operating engine 1 is shifted from the rich state to a lean state to cope with fluctuations in the driving load, the amount of unburned fuel supplied to the catalyst 31 decreases. Consequently, the nitrogen oxides adsorbed to the catalyst 31 do not react with the unburned fuel, resulting in an insufficient reduction of the nitrogen oxides adsorbed to the catalyst 31.

Therefore, the control device 5 brings the clutch 14 into the disengaged state so that the engine 1 is not affected by fluctuations in the driving load, thereby driving the driven device 2 solely with the power of the motor 15 to bring the air-fuel mixture of the operating engine 1 into the rich state. As a result, the control device 5 only needs to adjust the output of the motor 15 in response to fluctuations in the driving load, eliminating the need to change the output of the operating engine 1. Accordingly, the control device 5 can maintain the air-fuel mixture of the operating engine 1 in the rich state. As a result, the purification system S can continuously supply unburned fuel to the catalyst 31, thereby sufficiently purifying and removing the nitrogen oxides adsorbed to the catalyst 31. Hereinafter, a configuration of the control device 5 will be specifically described.

[Configuration of Control Device 5]

Figure 2:
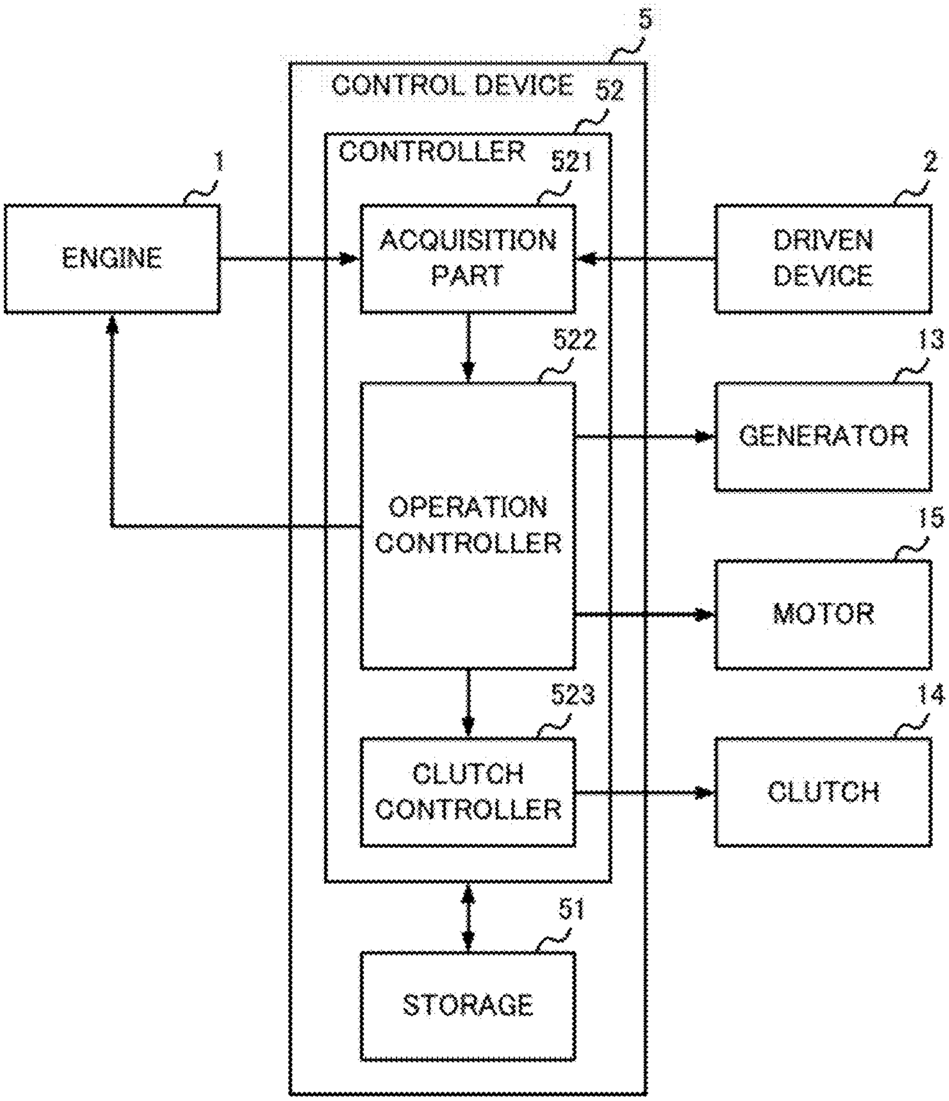
FIG. 2 illustrates a configuration of a control device.

FIG. 2 illustrates the configuration of the control device 5. The control device 5 includes a storage 51 and a controller 52. The storage 51 is a storage medium including a Read Only Memory (ROM), a Random Access Memory (RAM), a hard disk, and the like. The storage 51 stores a program executed by the controller 52.

The controller 52 is a calculation resource including a processor such as a Central Processing Unit (CPU). The controller 52 realizes the functions of the acquisition part 521, the clutch controller 523, and the operation controller 522 by executing the program stored in the storage 51.

The acquisition part 521 acquires the adsorption amount of the nitrogen oxide adsorbed to the catalyst 31. For example, the acquisition part 521 acquires the adsorption amount on the basis of an amount of exhaust gas discharged from the engine 1. Specifically, the acquisition part 521 acquires a greater adsorption amount as the amount of exhaust gas, determined on the basis of the rotational speed of the engine 1 and the amount of fuel injected into the combustion chamber of the engine 1, increases. More specifically, the acquisition part 521 i) acquires an integrated value obtained by integrating the amount of exhaust gas discharged from the engine 1 per unit time from the point in time when the adsorption amount reached the lower limit of the amount that the catalyst 31 can adsorb to the current point in time and ii) acquires the adsorption amount corresponding to the integrated value. The lower limit of the adsorption amount is 0, for example. The adsorption amount corresponding to the integrated value of the amount of exhaust gas is determined in advance by experiment or the like. A data table indicating the relationship between the integrated value of the amount of exhaust gas and the adsorption amount is stored in the storage 51, for example. The acquisition part 521 acquires the adsorption amount corresponding to the integrated value of the amount of exhaust gas with reference to the data table stored in the storage 51.

The acquisition part 521 acquires the driving load of the driven device 2. The driving load is a magnitude of the load necessary for driving the driven device 2. For example, the acquisition part 521 acquires load information indicating the driving load of the driven device 2 from a sensor provided in the driven device 2. As a specific example, the acquisition part 521 acquires torque as the load information indicating the driving load of the driven device 2 from a sensor that detects the torque of the driven device 2.

The operation controller 522 and the clutch controller 523 execute a process for reducing the adsorption amount when the adsorption amount reaches or exceeds a predetermined value. The predetermined value is set to a value so that the amount of nitrogen oxides adsorbed to the catalyst 31 does not reach the maximum capacity of the catalyst 31 for adsorbing nitrogen oxides until the process to reduce the adsorption amount begins. The predetermined value may be 80% of the catalyst 31's maximum capacity for adsorbing nitrogen oxides, for example, but is not limited thereto.

Figure 3:
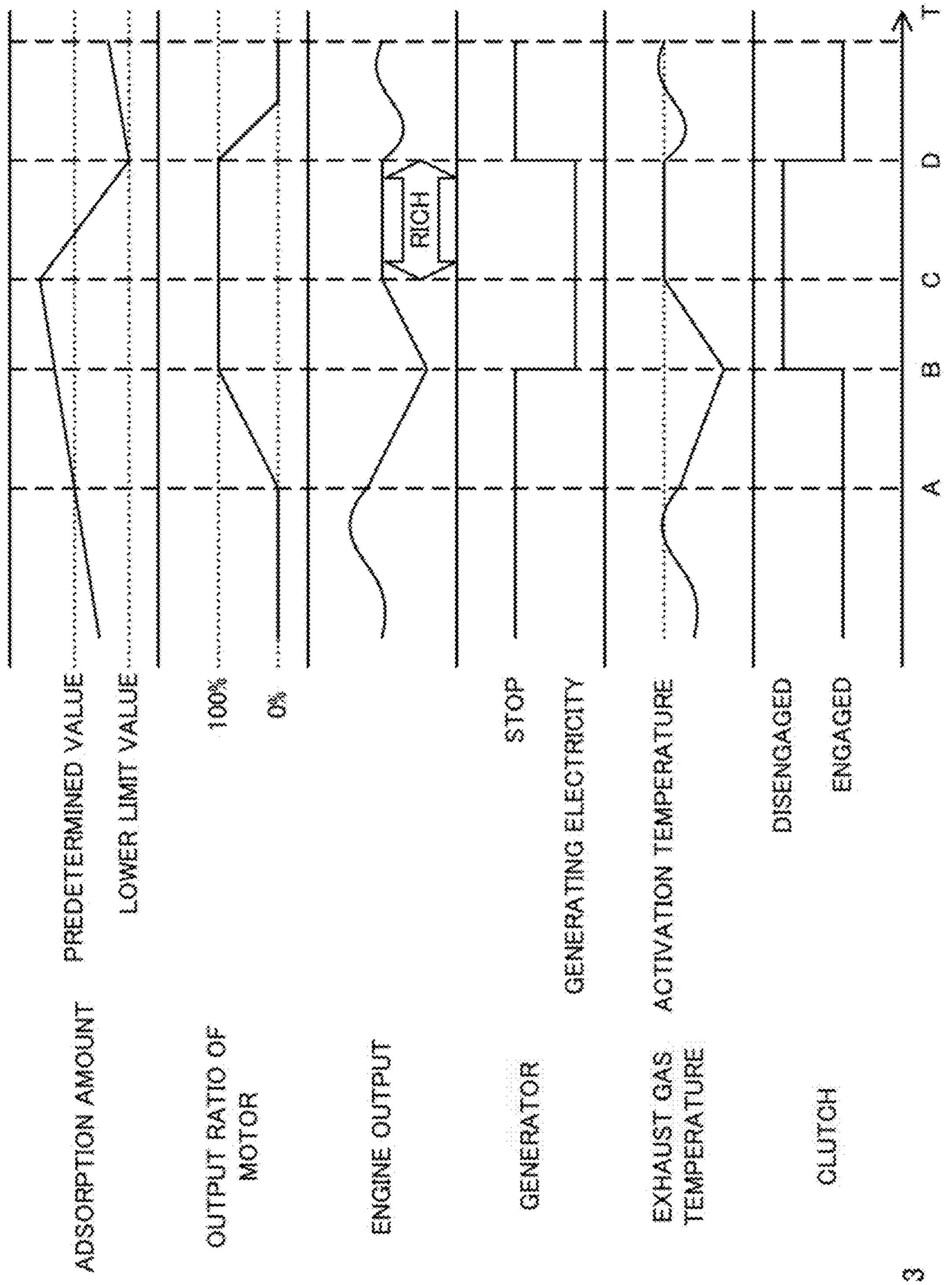
FIG. 3 illustrates a process for reducing an adsorption amount.

FIG. 3 illustrates a process for reducing the adsorption amount. The horizontal axis of FIG. 3 represents a time T. The time A is a time at which the adsorption amount reaches the predetermined value. The engine 1 has been operating in the lean state since before the time A. The clutch 14 has been in the engaged state since before the time A. The motor 15 is not driven, so that the output ratio of the motor 15 relative to the driving load is 0%. The adsorption amount continues to increase while the engine 1 is operating in the lean state.

The operation controller 522 decreases the output of the engine 1 and increases the output of the motor 15 after the time A. In other words, the operation controller 522 decreases the output ratio of the engine 1 relative to the driving load and increases the output ratio of the motor 15 relative to the driving load. The operation controller 522 continues to increase the output of the motor 15 relative to the driving load until the output ratio of the motor 15 relative to the driving load reaches 100%, while continuing to decrease the output of the engine 1. The output ratio of the motor 15 relative to the driving load reached 100% at a time B.

The clutch controller 523 brings the clutch 14, which is in the engaged state, into the disengaged state at the time B when the output ratio of the motor 15 relative to the driving load becomes 100%. Specifically, the clutch controller 523 brings the clutch 14 into the disengaged state at the timing when the output ratio of the motor 15 relative to the driving load becomes 100%. The clutch controller 523 brings the clutch 14 into the disengaged state to cause the driven device 2 to be driven solely with the power of the motor 15.

The operation controller 522 drives the generator 13 using the power of the engine 1 at the timing when the clutch 14 is in the disengaged state. In other words, the generator 13 starts generating electricity at the timing when the clutch 14 is in the disengaged state. Accordingly, the operation controller 522 can convert the output of the operating engine 1 into electricity without wasting the output.

The operation controller 522 changes the output of the motor 15 according to the driving load, after the clutch 14 is brought into the disengaged state. The operation controller 522 increases the output of the motor 15 if the driving load increases, and decreases the output of the motor 15 if the driving load decreases. In this way, the operation controller 522 can cope with fluctuations in the driving load by changing the output of the motor 15, and thus it is not necessary to change the engine load of the engine 1.

Meanwhile, during a period from the time A to the time B in FIG. 3, exhaust gas temperature decreases as the output of the engine 1 decreases. If the exhaust gas temperature is lower than the activation temperature of the catalyst 31, the catalyst 31 cannot facilitate the reaction between the nitrogen oxides and the unburned fuel even when the unburned fuel is supplied. The operation controller 522 increases the exhaust gas temperature after the time B in order to set the catalyst 31 at or above the activation temperature. Specifically, the operation controller 522 increases combustion temperature of the air-fuel mixture in the combustion chamber by causing an injector for injecting fuel to inject fuel into the combustion chamber of the engine 1 a plurality of times. More specifically, after the main injection, the operation controller 522 increases the combustion temperature by causing the injector to inject a smaller amount of fuel into the combustion chamber than the amount of fuel injected during the main injection. The exhaust gas temperature increases as the combustion temperature increases. It should be noted that the operation controller 522 may increase the exhaust gas temperature using other methods.

The exhaust gas temperature reaches or exceeds the activation temperature at a time C. When the exhaust gas temperature reaches or exceeds the activation temperature, the temperature of the catalyst 31 also reaches or exceeds the activation temperature. The operation controller 522 brings the air-fuel ratio of the operating engine 1 into the rich state, which is less than the predetermined air-fuel ratio, at the time C when the exhaust gas temperature reaches or exceeds the activation temperature. The predetermined air-fuel ratio is the stoichiometric air-fuel ratio, but may be a value smaller than the stoichiometric air-fuel ratio (for example, about 90% of the stoichiometric air-fuel ratio). The operation controller 522 brings the air-fuel ratio into the rich state by reducing the amount of intake air supplied to the combustion chamber of the operating engine 1, for example. Further, if the exhaust gas can be recirculated to the intake pipe of the engine 1, the operation controller 522 increases the amount of exhaust gas recirculated to the intake pipe to bring the air-fuel ratio into the rich state. The operation controller 522 may bring the air-fuel ratio into the rich state by increasing the amount of fuel injected into the combustion chamber of the engine 1. The operation controller 522 can bring the air-fuel ratio into the rich state using a known method other than the above.

When the air-fuel ratio is in the rich state, the unburned fuel is discharged from the engine 1, and thus the unburned fuel is supplied to the catalyst 31. The catalyst 31 receives the supply of the unburned fuel and facilitates the reaction between the adsorbed nitrogen oxides and the unburned fuel. The unburned fuel and the nitrogen oxides react on the catalyst 31 to form nitrogen. Specifically, the unburned fuel and the nitrogen oxides react on the catalyst 31 to be converted into nitrogen, water, and carbon dioxide. As a result, the amount of nitrogen oxides adsorbed to the catalyst 31 decreases. The adsorption amount decreases after the time C when the air-fuel ratio of the operating engine 1 is in the rich state. The adsorption amount becomes a lower limit value smaller than the predetermined value at a time D. The lower limit is 0, for example, but is not limited thereto.

The clutch controller 523 sets the clutch 14, which is in the disengaged state, to the engaged state at the time D. The clutch controller 523 brings the clutch 14 into the engaged state to cause the driven device 2 to be driven with the power of the engine 1.

The operation controller 522 brings the air-fuel ratio of the operating engine 1 into the lean state at a timing when the clutch 14 is in the engaged state. Further, if the output of the engine 1 is smaller than the driving load, the operation controller 522 increases the output of the engine 1 until the output of the engine 1 is equal to the driving load. If the output of the engine 1 is greater than the driving load, the operation controller 522 lowers the output of the engine 1 until the output of the engine 1 is equal to the driving load.

After the clutch 14 enters the engaged state, the operation controller 522 lowers the output of motor 15 to lower the output ratio of the motor 15 relative to the driving load. Specifically, the operation controller 522 lowers the output of the motor 15 until the output ratio of the motor 15 relative to the driving load becomes 0%. That is, the operation controller 522 decreases the output of the motor 15 to zero.

In addition, the operation controller 522 causes the generator 13 to stop generating electricity at a timing when the clutch 14 is in the engaged state.

The operation controller 522 and the clutch controller 523 execute a process for reducing the adsorption amount every time the adsorption amount reaches or exceeds the predetermined value during the operation of the engine 1. In this manner, the purification system S can reduce the adsorption amount of the nitrogen oxides adsorbed to the catalyst 31 while maintaining the travel of the vehicle using the power of the motor 15, for example, when the adsorption amount reaches or exceeds the predetermined value while the vehicle is traveling using the power of the engine 1.

Modified Example

The motor 15 of the purification system S according to the above embodiment receives electricity from the inverter 4. Alternatively, the purification system S may include a battery instead of the inverter 4, and the motor 15 may be supplied with electricity from the battery that stores electricity. The battery is charged by being supplied with electricity from the generator 13. The battery supplies the charged electricity to the motor 15. The purification system S according to the modified example can operate the motor 15 by supplying the electricity from the battery to the motor 15 while charging the battery with the electricity of the generator 13. It should be noted that the purification system S may include both the inverter 4 and the battery.

[Effects of Purification System S]

As described above, when the adsorption amount of the nitrogen oxides adsorbed to the catalyst 31 provided in the exhaust pipe 12 reaches or exceeds the predetermined value, the purification system S brings the clutch 14 into the disengaged state, where the power of the engine 1 supplied to the driven device 2 is interrupted, thereby enabling the driven device 2 to be driven solely by the power of the motor 15. Furthermore, when the driven device 2 is driven solely by the power of the motor 15, the purification system S brings the air-fuel ratio of the operating engine 1 into the rich state, which is lower than the stoichiometric air-fuel ratio. When the air-fuel ratio of the operating engine 1 is in the rich state, the unburned fuel is discharged from the engine 1. The catalyst 31 facilitates the reaction between the unburned fuel discharged from the engine 1 and the nitrogen oxides adsorbed to the catalyst 31, thereby purifying the nitrogen oxides adsorbed to the catalyst 31.

The purification system S, while maintaining the air-fuel ratio of the operating engine 1 in the rich state, only needs to change the output of the motor 15 if the driving load of the driven device 2 changes, without the need to change the output of the engine 1. Accordingly, the purification system S can continuously maintain the air-fuel ratio of the operating engine 1 in the rich state. As a result, unburned fuel is continuously supplied from the engine 1 to the catalyst 31, allowing the catalyst 31 to continuously facilitate the reaction between the adsorbed nitrogen oxides and the unburned fuel. In this way, the purification system S can appropriately purify nitrogen oxides adsorbed to the catalyst 31.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

The invention claimed is:

1. A purification system comprising:

a clutch that switches between transmitting and interrupting power of an engine to a driven device, which is driven by the power of the engine and power of a motor;

a catalyst that i) adsorbs nitrogen oxides in exhaust gas of the engine if an air-fuel ratio is a predetermined air-fuel ratio or more, and ii) facilitates a reaction between unburned fuel contained in gas discharged from the engine and the adsorbed nitrogen oxides if the air-fuel ratio is less than the predetermined air-fuel ratio;

an acquisition part that acquires an adsorption amount of the nitrogen oxides adsorbed to the catalyst;

a clutch controller that controls the clutch to interrupts the power of the engine to the driven device if the driven device is driven by the power of the engine and the adsorption amount reaches or exceeds a predetermined value; and an operation controller that brings the air-fuel ratio of the engine in operation to be less than the predetermined air-fuel ratio if the adsorption amount reaches or exceeds the predetermined value and the driven device is driven solely by the power of the motor, wherein the acquisition part acquires a driving load of the driven device, and when the adsorption amount reaches or exceeds the predetermined value, the operation controller i) decreases output ratio of the engine relative to the driving load and ii) increases output ratio of the motor relative to the driving load, with the clutch in an engaged state where the power of the engine is transmitted to the driven device.

2. The purification system according to claim 1, wherein the motor is provided between the driven device and the clutch, and the clutch is provided between the engine and the motor.

3. The purification system according to claim 1, comprising:

a generator that generates electricity using an output of the engine, wherein the motor is driven by electricity of the generator.

4. The purification system according to claim 1, wherein if the output ratio of the motor relative to the driving load becomes 1, the clutch controller brings the clutch into a disengaged state where transmission of the power of the engine to the driven device is interrupted.

5. The purification system according to claim 4, wherein the catalyst facilitates a reaction between the unburned fuel and the nitrogen oxides at or above its activation temperature, and the operation controller brings the air-fuel ratio to less than the predetermined air-fuel ratio when exhaust gas temperature of the engine reaches or exceeds the activation temperature after the clutch enters the disengaged state.

6. The purification system according to claim 5, wherein the operation controller increases the exhaust gas temperature until the exhaust gas temperature reaches or exceeds the activation temperature if the exhaust gas temperature is lower than the activation temperature after the clutch enters the disengaged state.

7. The purification system according to claim 4, wherein the clutch controller brings the clutch into the engaged state if the adsorption amount reaches or exceeds a lower limit value smaller than the predetermined value after bringing the clutch into the disengaged state.

8. The purification system according to claim 7, wherein the operation controller decreases the output ratio of the motor relative to the driving load after the clutch enters the engaged state.

9. The purification system according to claim 1, wherein the acquisition part acquires a greater value of the adsorption amount as an amount of exhaust gas discharged from the engine increases.

10. A purification system comprising:

a clutch that switches between transmitting and interrupting power of an engine to a driven device, which is driven by the power of the engine and power of a motor;

a catalyst that i) adsorbs nitrogen oxides in exhaust gas of the engine if an air-fuel ratio is a predetermined air-fuel ratio or more, and ii) facilitates a reaction between unburned fuel contained in gas discharged from the engine and the adsorbed nitrogen oxides if the air-fuel ratio is less than the predetermined air-fuel ratio;

an acquisition part that acquires an adsorption amount of the nitrogen oxides adsorbed to the catalyst;

a clutch controller that controls the clutch to interrupts the power of the engine to the driven device if the driven device is driven by the power of the engine and the adsorption amount reaches or exceeds a predetermined value; and an operation controller that brings the air-fuel ratio of the engine in operation to be less than the predetermined air-fuel ratio if the adsorption amount reaches or exceeds the predetermined value and the driven device is driven solely by the power of the motor, wherein the acquisition part references a data table indicating a relationship between an integrated value of an amount of exhaust gas and an adsorption amount to acquire an adsorption amount corresponding to an integrated value obtained by integrating an amount of exhaust gas discharged from the engine per unit time from a time point when the adsorption amount reaches a lower limit value of an amount that can be adsorbed to the catalyst to a current time point.

* * * * *